(12) United States Patent
Chen et al.

(10) Patent No.: US 8,240,559 B2
(45) Date of Patent: Aug. 14, 2012

(54) CARD EJECTION UNIT OF AN IMPROVED IC CARD DEVICE

(75) Inventors: Shou-Yi Chen, Banciao (TW); Chang Wei, Banciao (TW)

(73) Assignee: T-Conn Precision Corporation, Taipei (TW)

( * ) Notice: Subject to any disclaimer, the term of this patent is extended or adjusted under 35 U.S.C. 154(b) by 486 days.

(21) Appl. No.: 12/467,277

(22) Filed: May 17, 2009

(65) Prior Publication Data

US 2010/0288838 A1    Nov. 18, 2010

(51) Int. Cl.
*G06K 5/00* (2006.01)

(52) U.S. Cl. ........................................... 235/380
(58) Field of Classification Search ............ 235/380
See application file for complete search history.

(56) References Cited

U.S. PATENT DOCUMENTS

| | | | | |
|---|---|---|---|---|
| 5,225,666 A | * | 7/1993 | Amarena et al. | 235/476 |
| 5,275,573 A | * | 1/1994 | McCleerey | 439/159 |
| 5,879,175 A | * | 3/1999 | Muramatsu et al. | 439/159 |
| 6,010,344 A | * | 1/2000 | Muramatsu et al. | 439/159 |
| 7,357,655 B1 | * | 4/2008 | Van der Steen | 439/188 |

* cited by examiner

*Primary Examiner* — Daniel Hess
*Assistant Examiner* — David Tardif

(57) ABSTRACT

The card ejection unit of an improved IC card device has a base, a reading unit and a card ejection unit. The base has a horizontal slide track, a vertical slide track, a positioning member, an axle and an elastic element. The reading unit has a reading portion, a soft circuit and calculation portion. The card ejection unit has a motor, a rotation bar, a horizontal buckle and a vertical elastic unit. The motor pushes the rotation bar, and when the rotation bar rotates, the push portion of the rotation bar pushes the horizontal buckle to release the vertical elastic element to eject out the IC card.

11 Claims, 9 Drawing Sheets

CARD EJECTION UNIT OF AN IMPROVED IC CARD DEVICE

BACKGROUND OF THE INVENTION

1. Field of the Invention

The present invention relates to an improved IC card device and the card ejection unit thereof; and more particularly to a card ejection unit applied in a data reader.

2. Description of Related Art

The information era has come to lead people living with technology and fashion. Along with the gradually popular related information devices, the electronic card storage device has gradually replaced the conventional identification card and cash, for example, ID card and bills. The identification IC card is being widely used in various public services, for example, the ID card or insurance with IC. People usually use such electronic card storage device for various types of trade related matters in our daily lives, for instance, using credit card for purchasing merchandises, and using ATM card to transfer or withdraw money. Such electronic card storage device has IC or magnetic strip for storing information, and to read out the information therein when being inserted into a corresponding reading device. Furthermore, the electronic card inserted in the reading device needs an ejection mechanism to release electronic card from the reading device effectively.

The conventional card ejection device mostly has a plurality of gears to eject the card by the mutual cooperation between those gears. However, such card ejector takes a larger space and usually applied in the larger machines, for example, the ATM. Because the electronic cards are popularly used for reading information, public transportation and electronic merchandising, and therefore the size of such device is preferably desired to be minimized to enable the user to carry for convenient usage. Accordingly, the miniaturized card ejector is required for satisfying the above need.

A conventional card ejector has a plurality of gears and a motor disposed at the entrance/exit of the electronic card and uses an electronic loop for controlling the gears and the motor to release the card. However, the design of the conventional card ejector is complicated, and the gears and the motor occupy larger space and cannot meet the need of the miniaturized size.

Another conventional card ejector applied in the IC card reader has a motor, which is used to drive a plurality of connected bars and release the bouncing element connected to a spring to eject the IC card. Even though this card ejection mechanism has the advantages of being light, thin, shorter and smaller, the motor directly pushes the horizontal bar. Although the horizontal bar is buckled to the vertical elastic element, but the horizontal bar is an L shape element and is directly connected to the motor, and therefore it is difficult for the motor to push the bar. Thus, the motor has to directly deal with extra resistance exerted by the horizontal bar.

Accordingly, the above short comings of the convention card ejectors neither fits the requirement of miniaturization nor a proper design for ejecting the card, and therefore still a lot of improvements are needed.

SUMMARY OF THE INVENTION

The present invention provides an simple design for IC card device and a card ejector, which is easy to operate and has the advantages of being light, thin, short and small so as to meet the requirement of the market.

According to an embodiment of the present invention, the IC card ejector comprises a base, a reading unit and a card ejection unit. The base comprises a positioning member and a horizontal slide track adjacent to the positioning member. The horizontal slide track is a slide track for the horizontal buckle; and a side of the horizontal slide track provides a support to the horizontal buckle while buckling to the vertical elastic element. The base comprises a vertical slide track on a side as the slide track for the vertical elastic element. The base comprises a reading portion at a central region of a reading unit, and a soft circuit is positioned adjacent to the reading portion. The soft circuit comprises a distal end connected to the reading portion, and a primal end connected to a calculation portion. The card ejection unit comprises a motor, a rotation bar, a horizontal buckle and a vertical elastic unit. A rotation bar is positioned corresponding to the motor whose center is movably connected to the base. A distal end of the rotation bar is supported against a distal end of the motor, and a primal end of the rotation bar is supported against a distal end of the horizontal buckle. The horizontal buckle is able to slide in the sliding horizontal track of the base. The horizontal buckle comprises a distal end buckled so as to connect to the vertical elastic element. The horizontal buckle comprises a side supported against a side of the horizontal slide track of the base for providing a stable support to the vertical elastic element. The horizontal buckle comprises a primal end supported at a first spring. The vertical elastic element comprises a buckle portion, a slide block, a card push portion and a second spring. The slide block is fixedly positioned beneath the vertical elastic element and is able to slide in the vertical slide track of the base. The vertical elastic element comprises a buckle portion as a side, and a second spring positioned parallel at another side. The second spring comprises a distal end supported against a side of the vertical elastic element and a primal end supported against a stop. The buckle portion can buckle to the buckle portion of the horizontal buckle. The flange of the buckle portion can slide on the sliding surface of the horizontal buckle. The card push portion is positioned adjacent to the buckle portion for ejecting the IC card.

From the above description, the IC card device and the card ejector unit thereof of the present invention is lighter, thinner, shorter and smaller compared to the conventional art, and the motivation method of the card ejector unit thereof includes a rotation bar between the motor and the horizontal buckle. Thus, the direction of the force exerted by the motor is changed after passing by the rotation bar and directly passes the force onto the horizontal buckle so as to avoid the extra resistance from the horizontal buckle. Accordingly, the motor can be more efficiently applied. Besides, the horizontal buckle comprises a side positioned tightly against a side of the horizontal slide track of the base and thereby buckles the vertical elastic element to prevent any accidental ejection of the IC card.

BRIEF DESCRIPTION OF THE DRAWING

For a more complete understanding of the present invention, reference will now be made to the following detailed description of preferred embodiments taken in conjunction with the following accompanying drawings.

DETAIL DESCRIPTION OF THE INVENTION

Figure 1:
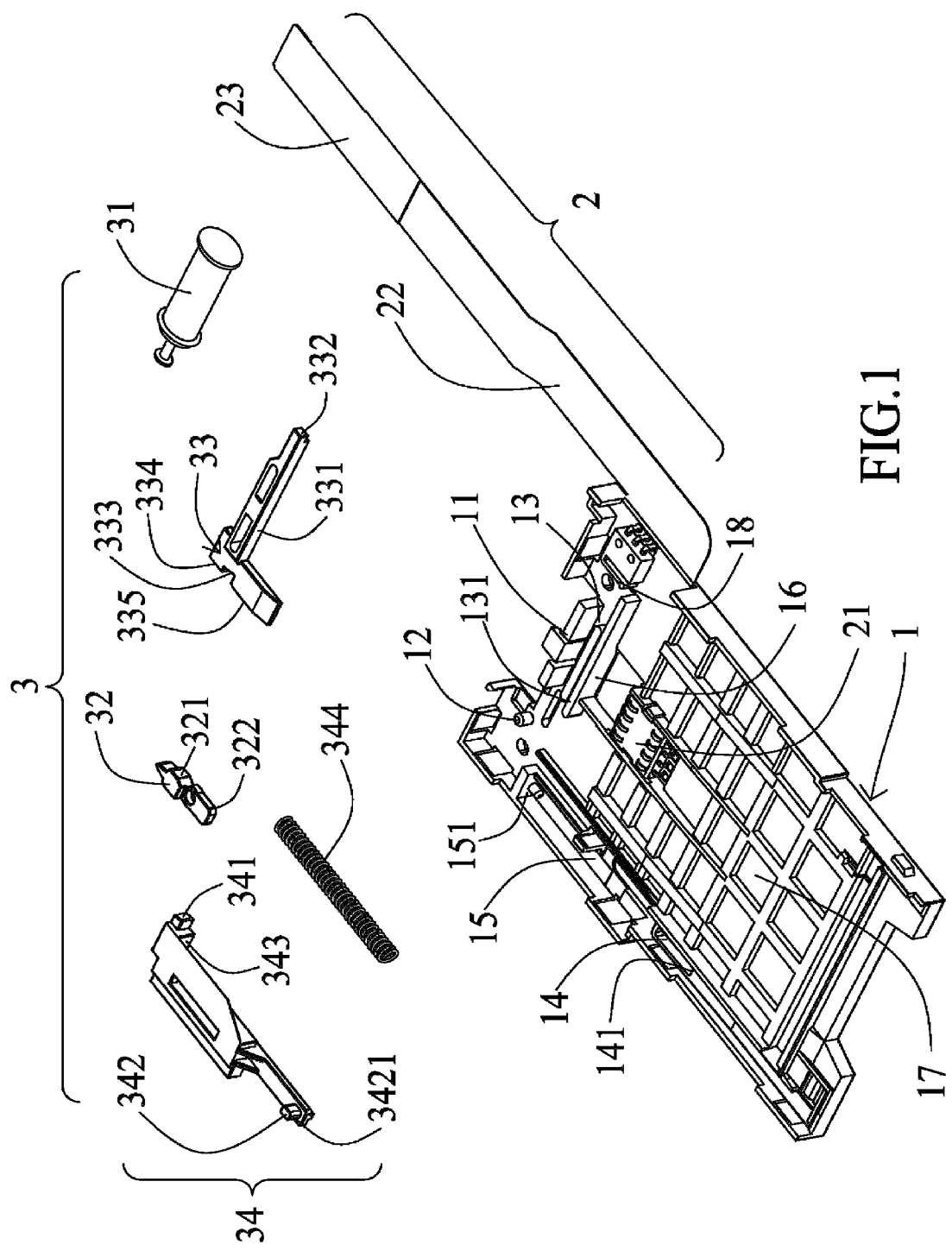
FIG. 1 is an exploded view of various components of IC card device and card ejector unit according to an embodiment of the present invention.
Figure 2:
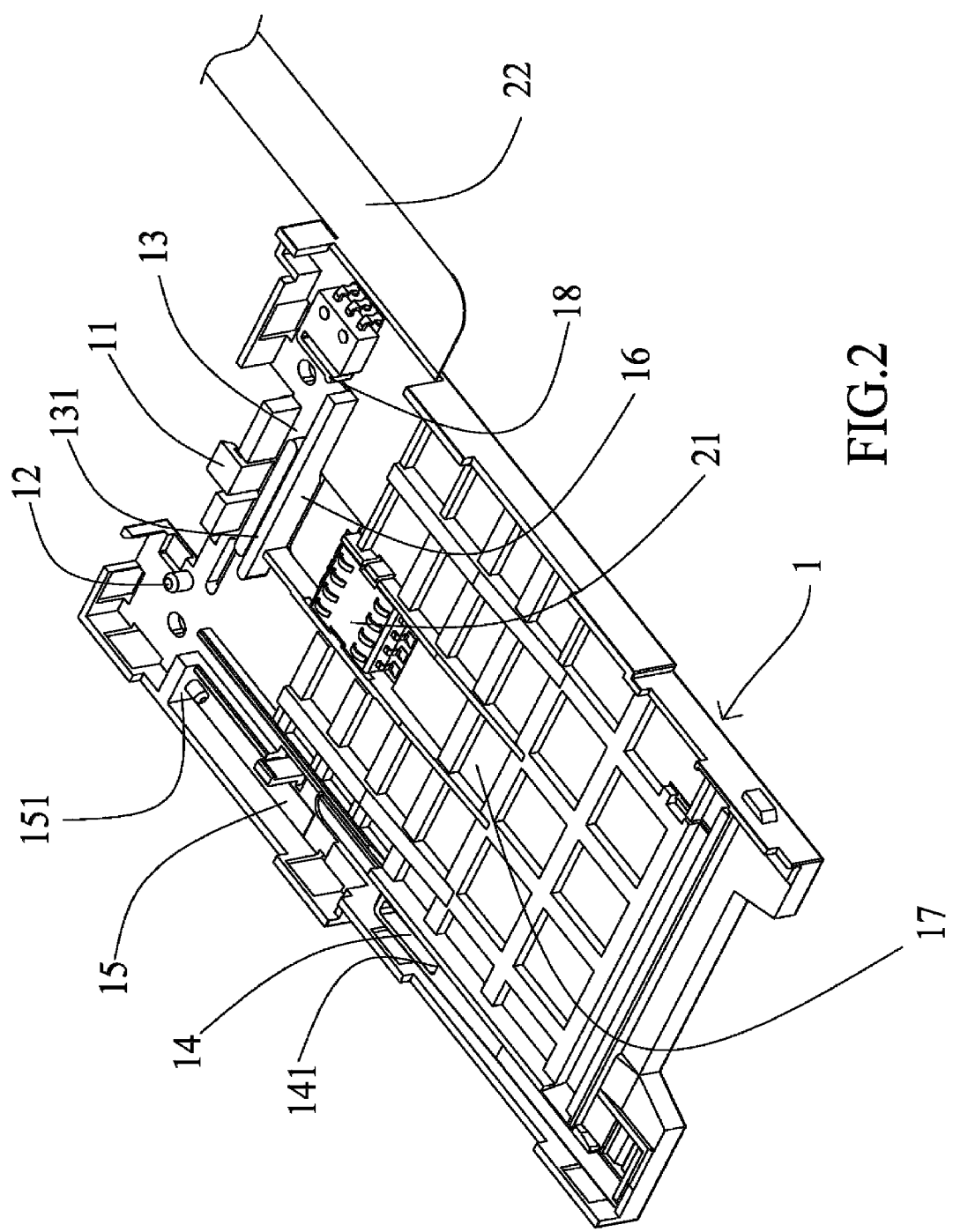
FIG. 2 is an elevational view of a base of card ejector unit according to an embodiment of the present invention.

Referring to FIG. 1, the IC card ejection unit comprises a base 1, a reading unit 2 and a card ejection unit 3. The IC card ejection unit can be applied in a reading device of any IC card or magnetic card. Referring to FIG. 2, the base 1 may be comprised of a plastic or a metallic material. The base 1 comprises a install's member 11 for positioning a motor 31, an axle 12 is positioned adjacent to the install's member 11, and a horizontal slide track 13 is positioned adjacent to the install's member 11. The horizontal slide track 13 comprises a stop 131 at a side thereof. The stop 131 is adopted for providing a support to a slide bar 331 of the horizontal buckle 33. A first spring 18 is positioned adjacent to the horizontal slide track 13. The first spring 18 can be a flat spring, a torsional spring, a compression spring or an expansion spring. The first spring 18 can be positioned on the horizontal buckle 33. The base 1 comprises a vertical slide track 14 positioned on a side. The vertical slide track 14 comprises a stop 141 at a distal end thereof. The stop 141 is adopted for limiting the movement of the vertical elastic element 34. A space 15 is formed adjacent to the vertical slide track 14 for receiving a second spring 344. The space 15 has a stop 151 at a side thereof. The base 1 comprises a reading unit 2 at the central region (FIG. 1), comprising a reading portion 21, a soft circuit 2 and a calculation portion 23. The reading unit 2 can be an IC or a magnetic reading device applied for reading an IC card, a prepaid card, an ATM card, a credit card and a MRT card. The reading portion 21 is positioned at a central region of the base 1. The reading portion 21 is connected to a soft circuit 22 connected to the calculation portion 23. The calculation portion 23 is positioned at a side of the base 1.

Figure 3A:
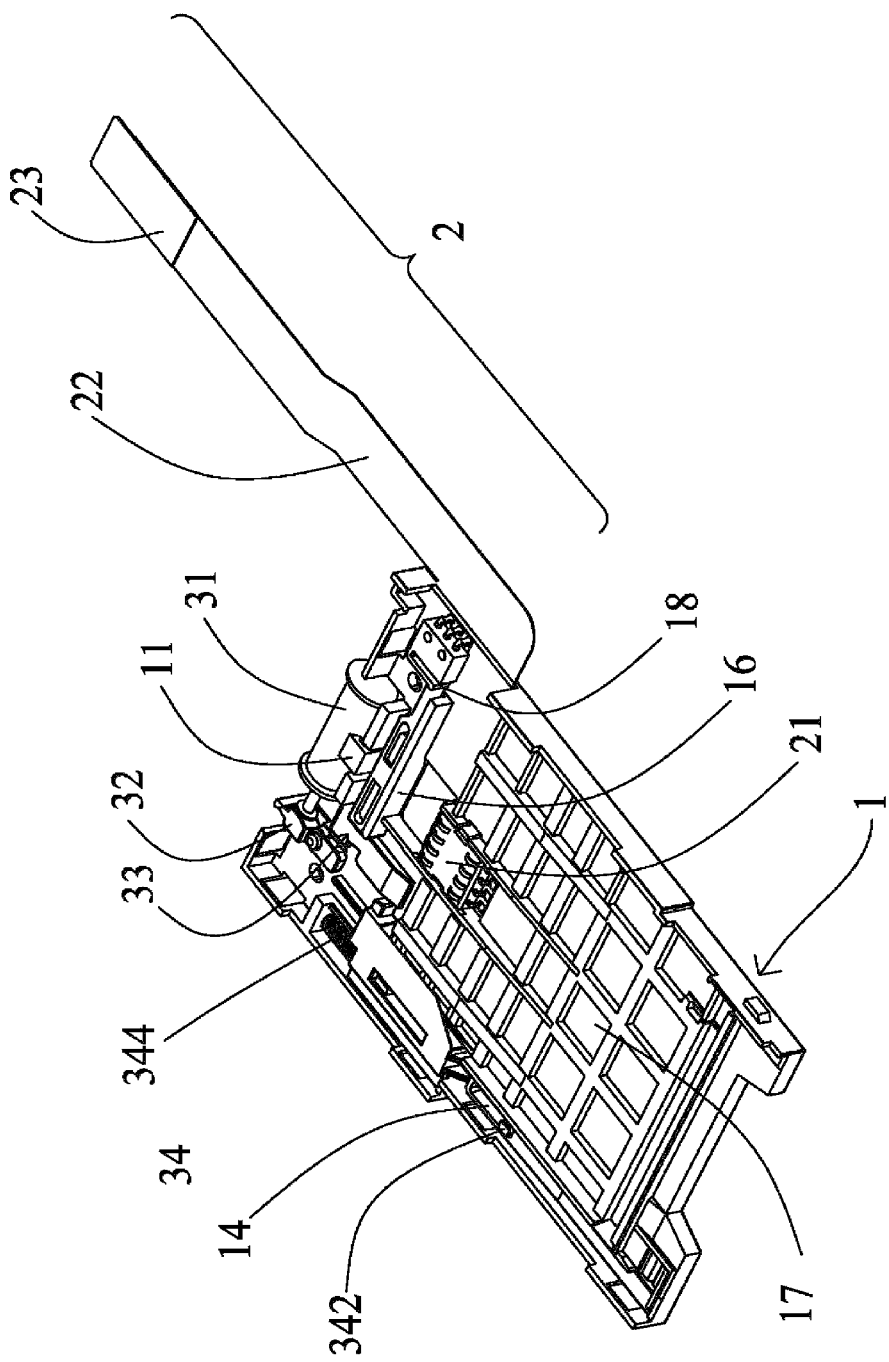
FIG. 3A is an elevational view of IC card device and card ejector unit according to an embodiment of the present invention.
Figure 3B:
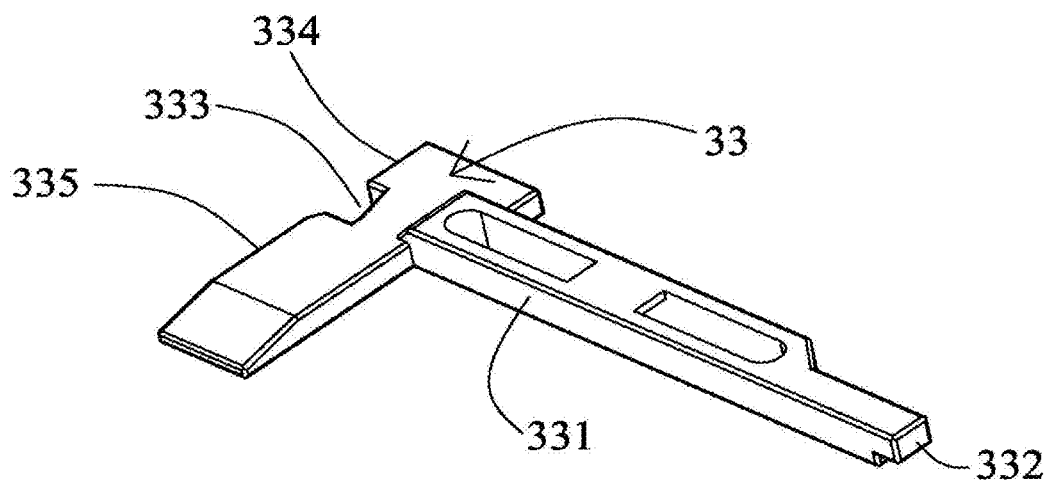
FIG. 3B is an elevational view illustrating a horizontal buckle of the card ejector unit according to an embodiment of the present invention.
Figure 3C:
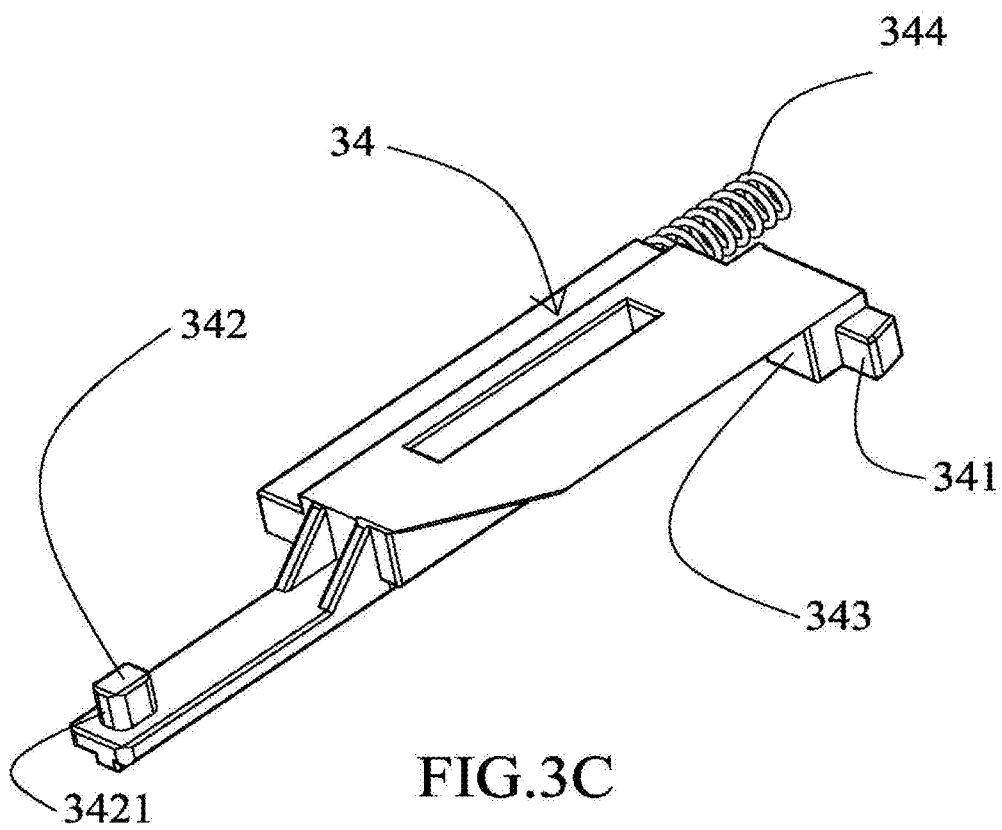
FIG. 3C is an elevational view illustrating a vertical elastic element of the card ejector unit according to an embodiment of the present invention.
Figure 4A:
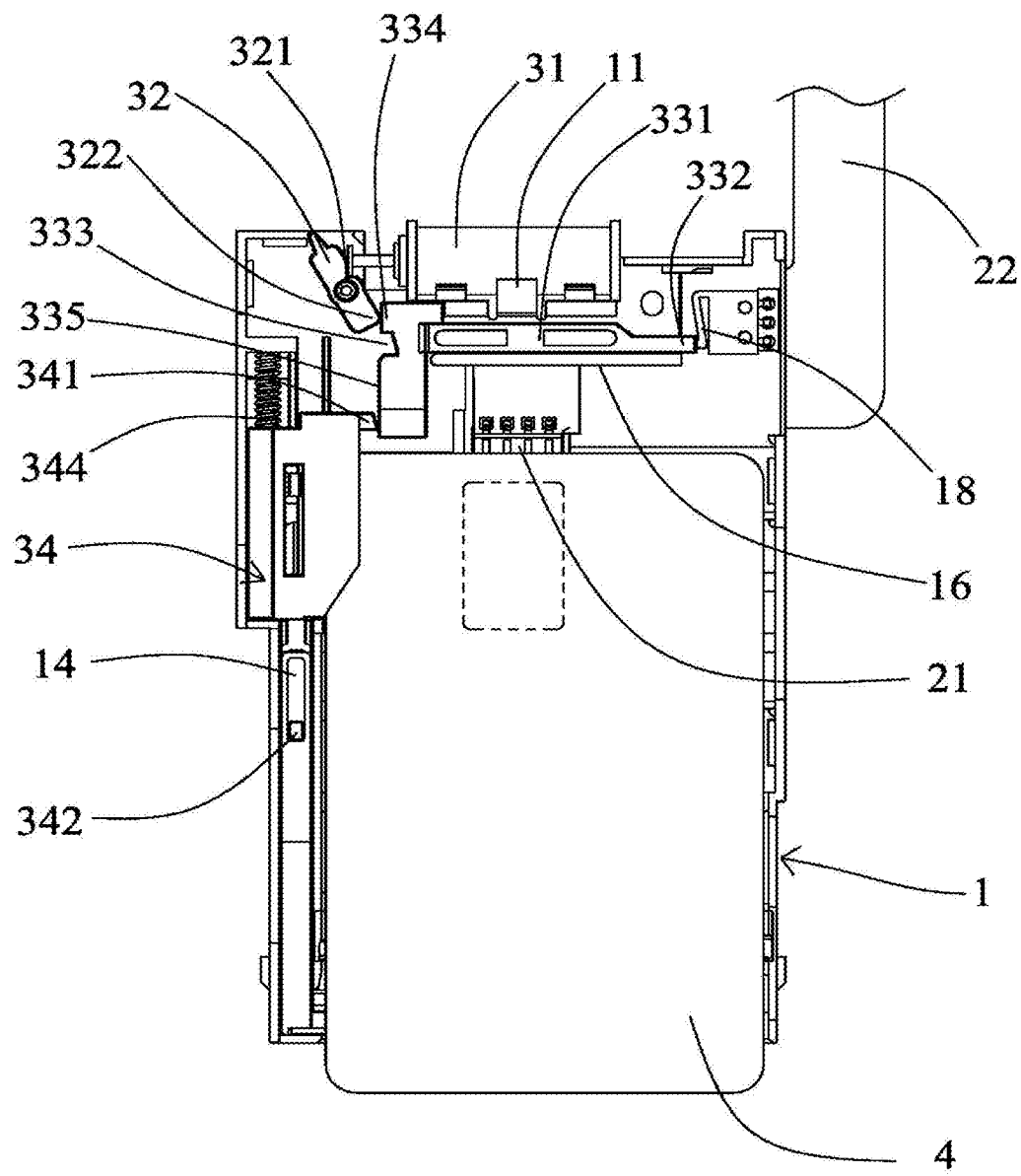
FIG. 4A is a perspective view illustrating while inserting into the card into IC card device and card ejector unit to an embodiment of the present invention.
Figure 4B:
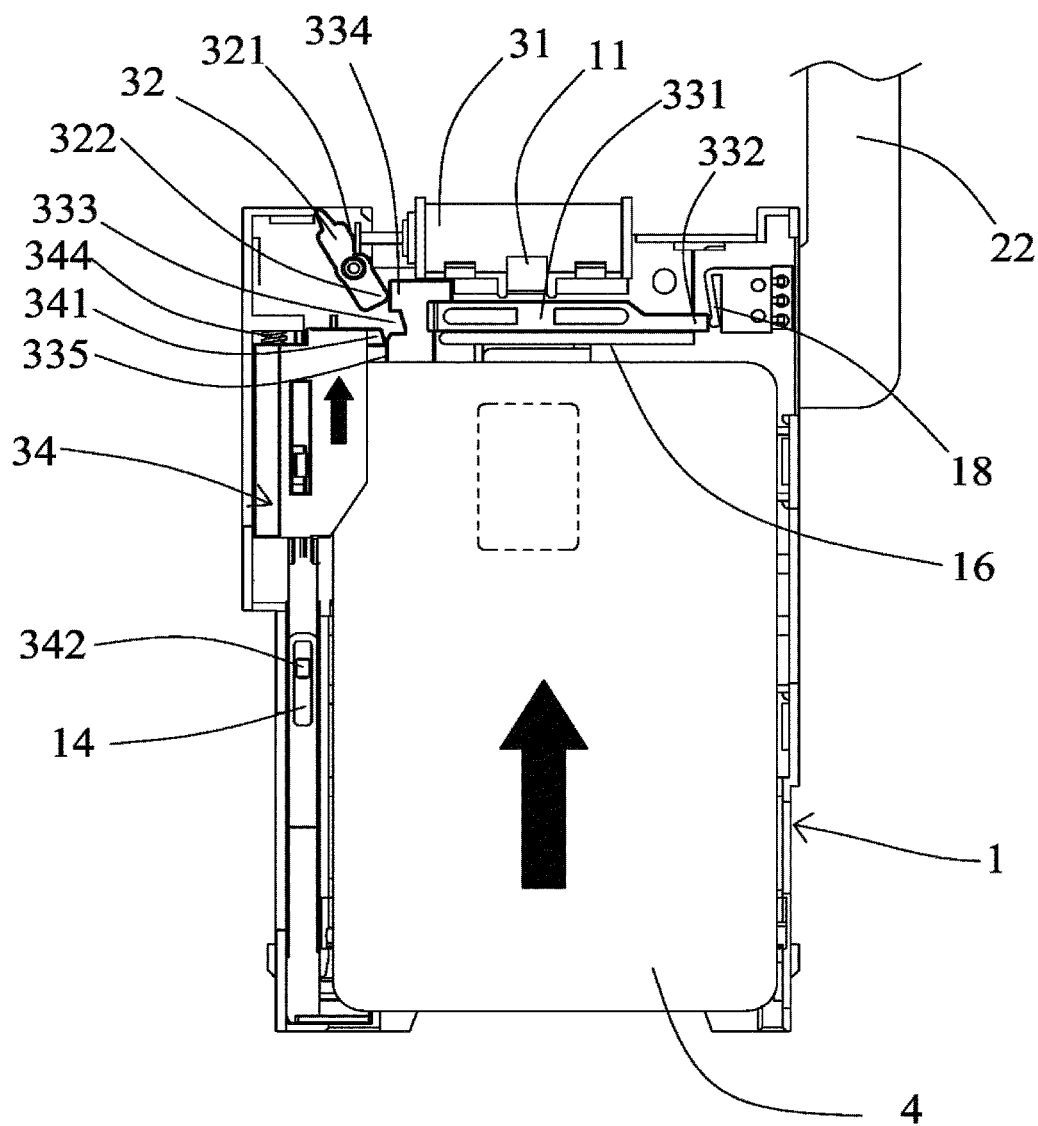
FIG. 4B is a perspective view illustrating while inserting into the card IC card device and card ejector unit according to an embodiment of the present invention.
Figure 4C:
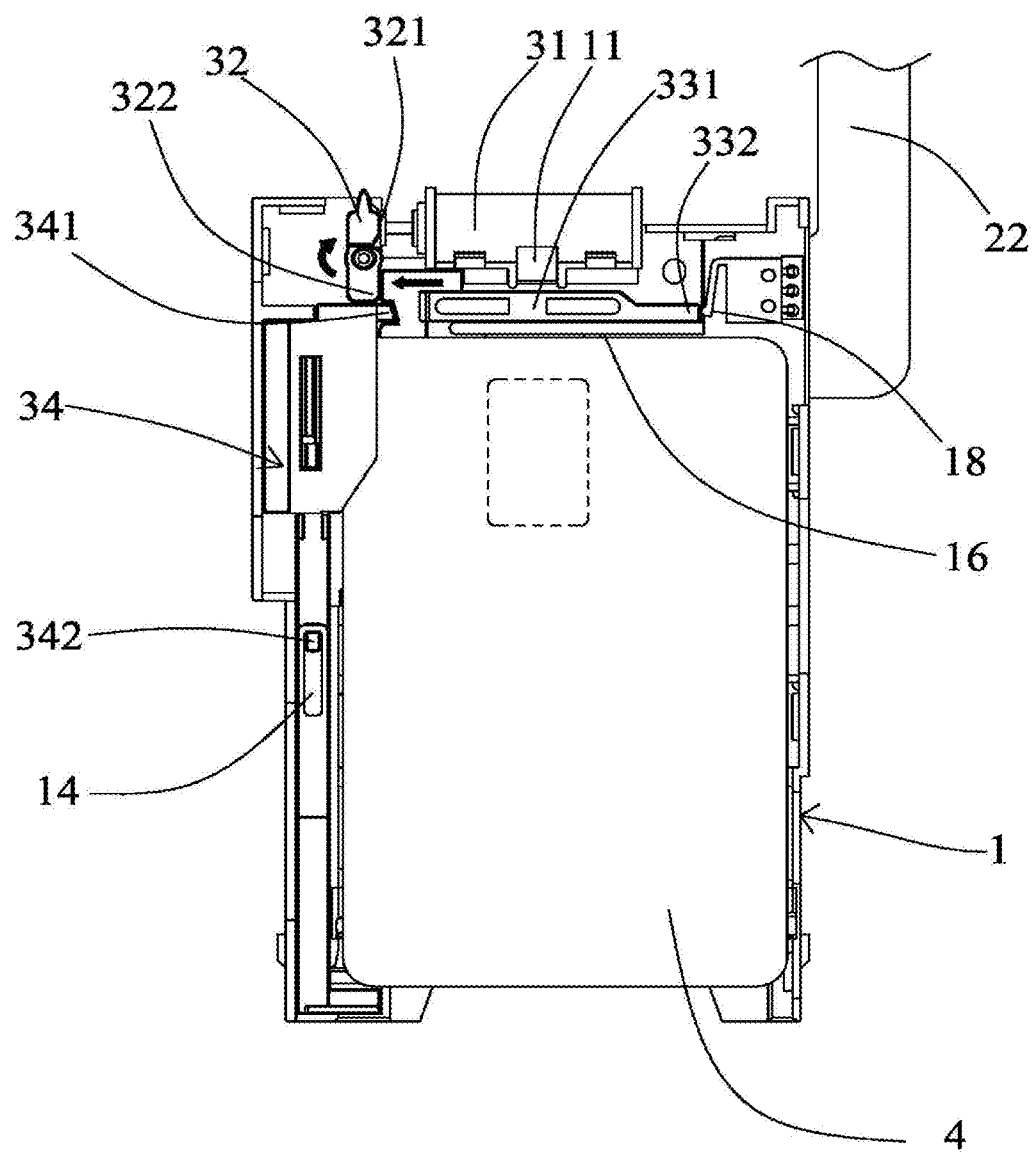
FIG. 4C is a perspective view illustrating while buckling according to an embodiment of the present invention.
Figure 5A:
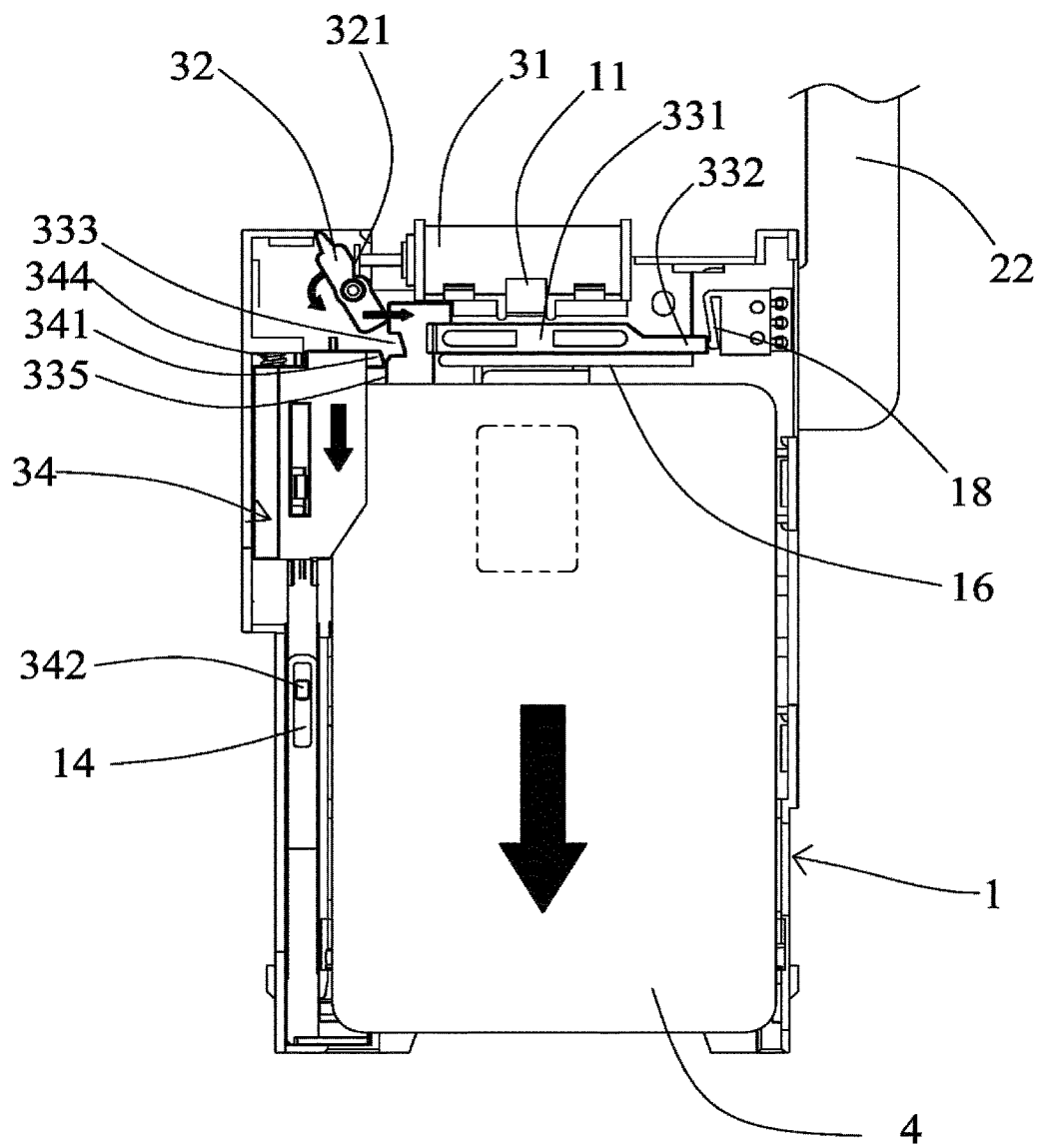
FIG. 5A is a perspective view illustrating while ejecting the card according to an embodiment of the present invention.
Figure 5B:
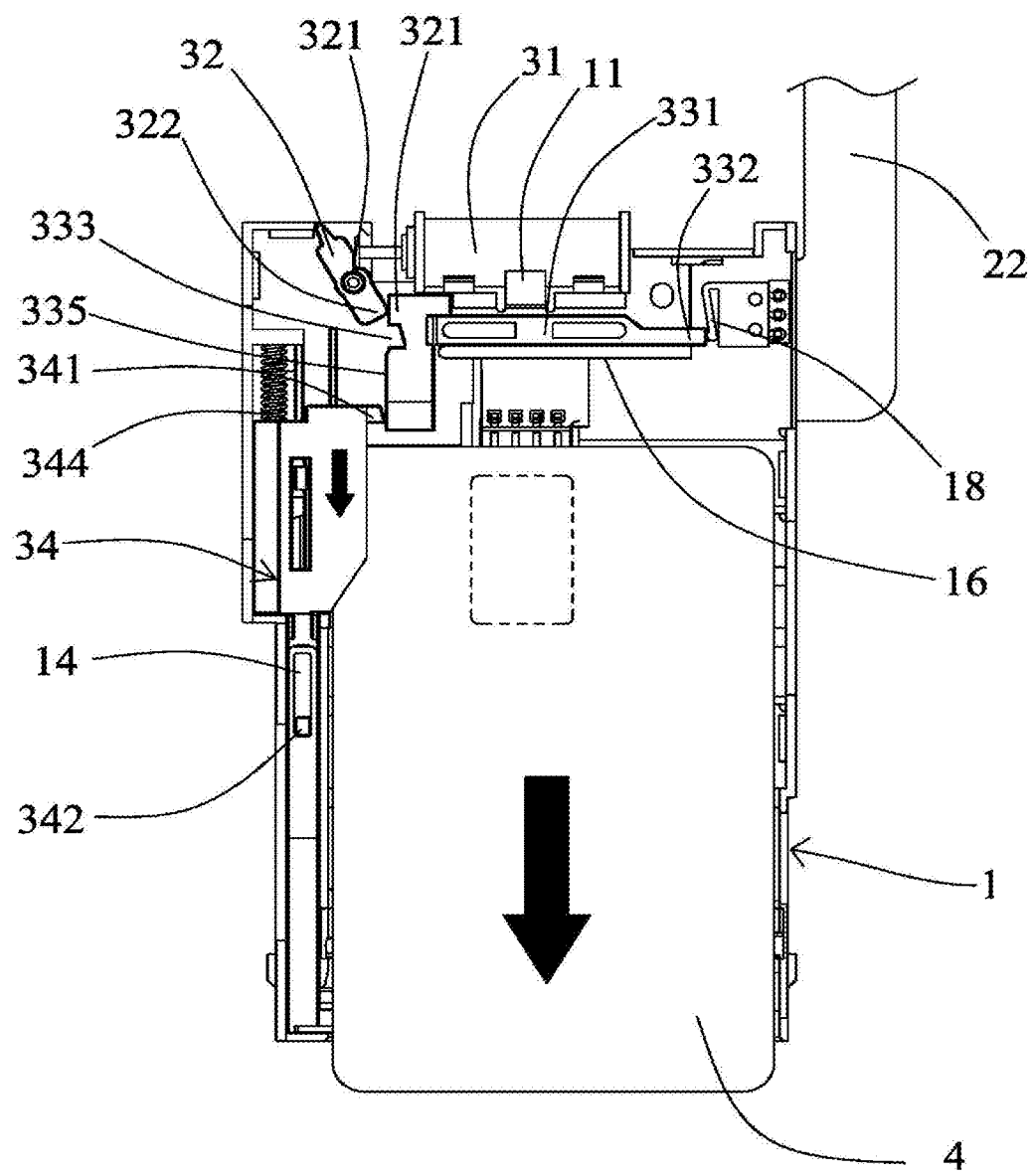
FIG. 5B is a perspective view illustrating while ejecting the card to an embodiment of the present invention.

Referring to FIG. 3A, the card ejection unit 3 comprises a motor 31, a rotation bar 32, a horizontal buckle 33 and a vertical elastic element 34. The card ejection unit 3 can be positioned at any side of the base 1, and the motor 31 can be a magnetic valve positioned on the install's member 11 of the base 1. The rotation bar 32 is positioned adjacent to a distal end of the motor 31, and the center of the rotation bar 32 is movably connected to the axle 12 of the base 1. The rotation bar 32 may be fabricated using a plastic or a metallic material. The rotation bar 32 comprises a support portion 321 at a distal end (FIG. 1) thereof. The support portion 321 is supported against an end of the motor 31. The rotation bar 32 comprises another support portion 322 at a primal end thereof, which is supported against the push portion 334 of the horizontal buckle 33. Referring to FIG. 3B, the horizontal buckle 33 may be fabricated using a plastic or a metallic material. The horizontal buckle 33 comprises a slide bar 331 sliding in the horizontal slide track 13 of the base 1. A side of the slide bar 331 is tightly attached to the stop 131 of the slide track 13. The horizontal buckle 33 comprises a push portion 332 at the distal end supporting at the first spring 18, and a buckle portion 333 at the primal end for buckling to the vertical elastic element 34. The push portion 334 is positioned adjacent to the buckle portion 333 corresponding to the push portion 322 of the rotation bar 32. A slide surface 335 is positioned adjacent to the buckle portion 333 to enable the flange of the buckle portion 341 of the vertical elastic element 34 to slide (FIG. 4A). Referring to FIG. 3C, the vertical elastic element 34 may be made of a plastic or a metallic material. The vertical elastic element 34 comprises a buckle portion 341, a slide block 342, a push card portion 343 and a second spring 344. The slide block 342 is positioned at the distal end of the vertical elastic element 34 in the vertical slide track 14 of the base 1. The slide block 342 comprises a stop 3421 at a distal end thereof and corresponds to the stop 141 of the vertical slide track 14 (FIG. 1). The buckle portion 341 of the vertical elastic element 34 comprises a push card portion 343 supporting at a flange of the IC card 4 for pushing out the IC card 4. The second spring 344 is positioned at a side of the vertical elastic element 34. The second spring 344 can be a compression spring or an expansion spring. The second spring 344 is movably positioned at the space 15 of the base 1. A distal end of the second spring 344 is connected to a side of the vertical elastic element 34, and another end thereof is supported at the stop 151 of the space 15 of the base 1.

Referring to FIG. 1, the IC card ejection unit comprises a base 1, a reading unit 2 and a card ejection unit 3. The IC card ejection unit can be applied in a reading device of any IC card or magnetic card. Referring to FIG. 2, the base 1 may be comprised of a plastic or a metallic material. The base 1 comprises a positioning member 11 for positioning a motor 31, an axle 12 is positioned adjacent to the positioning member 11, and a horizontal slide track 13 is positioned adjacent to the positioning member 11. The horizontal slide track 13 comprises a stop 131 at a side thereof. The stop 131 is adopted for providing a support to a slide bar 331 of the horizontal buckle 33. A first spring 18 is positioned adjacent to the horizontal slide track 13. The first spring 18 can be a flat spring, a torsional spring, a compression spring or an expansion spring. The first spring 18 can be positioned on the horizontal buckle 33. The base 1 comprises a vertical slide track 14 positioned on a side. The vertical slide track 14 comprises a stop 141 at a distal end thereof. The stop 141 is adopted for limiting the movement of the vertical elastic element 34. A space 15 is formed adjacent to the vertical slide track 14 for receiving a second spring 344. The space 15 has a stop 151 at a side thereof. The base 1 comprises a reading unit 2 at the central region (FIG. 1), comprising a reading portion 21, a soft circuit 2 and a calculation portion 23. The reading unit 2 can be an IC or a magnetic reading device applied for reading an IC card, a prepaid card, an ATM card, a credit card and a MRT card. The reading portion 21 is positioned at a central region of the base 1. The reading portion 21 is connected to a soft circuit 22 connected to the calculation portion 23. The calculation portion 23 is positioned at a side of the base 1.

Referring to FIG. 3A, the card ejection unit 3 comprises a motor 31, a rotation bar 32, a horizontal buckle 33 and a vertical elastic element 34. The card ejection unit 3 can be positioned at any side of the base 1, and the motor 31 can be a magnetic valve positioned on the positioning member 11 of the base 1. The rotation bar 32 is positioned adjacent to a distal end of the motor 31, and the center of the rotation bar 32 is movably connected to the axle 12 of the base 1. The rotation bar 32 may be fabricated using a plastic or a metallic material. The rotation bar 32 comprises a support portion 321 at a distal end (FIG. 1) thereof. The support portion 321 is supported against an end of the motor 31. The rotation bar 32 comprises another support portion 322 at a primal end thereof, which is supported against the push portion 334 of the horizontal buckle 33. Referring to FIG. 3B, the horizontal buckle 33 may be fabricated using a plastic or a metallic material. The horizontal buckle 33 comprises a slide bar 331 sliding in the horizontal slide track 13 of the base 1. A side of the slide bar 331 is tightly attached to the stop 131 of the slide track 13. The horizontal buckle 33 comprises a push portion 332 at the distal end supporting at the first spring 18, and a buckle portion 333 at the primal end for buckling to the vertical elastic element 34. The push portion 334 is positioned adjacent to the buckle portion 333 corresponding to the push portion 322 of the rotation bar 32. A slide surface 335 is positioned adjacent to the buckle portion 333 to enable the flange of the buckle portion 341 of the vertical elastic element 34 to slide (FIG. 4A). Referring to FIG. 3C, the vertical elastic element 34 may be made of a plastic or a metallic material. The vertical elastic element 34 comprises a buckle portion 341, a slide block 342, a push card portion 343 and a second spring 344. The slide block 342 is positioned at the distal end of the vertical elastic element 34 in the vertical slide track 14 of the base 1. The slide block 342 comprises a stop 3421 at a distal end thereof and corresponds to the stop 141 of the vertical slide track 14 (FIG. 1). The buckle portion 341 of the vertical elastic element 34 comprises a push card portion 343 supporting at a flange of the IC card 4 for pushing out the IC card 4. The second spring 344 is positioned at a side of the vertical elastic element 34. The second spring 344 can be a compression spring or an expansion spring. The second spring 344 is movably positioned at the space 15 of the base 1. A distal end of the second spring 344 is connected to a side of the vertical elastic element 34, and another end thereof is supported at the stop 151 of the space 15 of the base 1.

According to an aspect of the present invention, the card ejection unit 3 comprises the motor 31 to push the rotation bar 32, and when the rotation bar 32 rotates, an end of the rotation bar 32 pushes the horizontal buckle 33 to slide to further release the vertical elastic element 34.

To sum up, the IC card device and the card ejection unit of the present invention has a smaller size compared to the conventional art, and the ejection mechanism of the card ejection unit includes a rotation bar positioned between the motor and the horizontal buckle to change the direction of the force of the motor while passing by the rotation bar; the force is directly transferred to the horizontal buckle to prevent the resistance from the horizontal buckle, thus the motor can be more efficiently applied. Besides, the side of the horizontal buckle is tightly positioned against the side of the horizontal slide track of the base enabling buckling of the vertical elastic element to prevent any accidental ejection of the IC card.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations in which fall within the spirit and scope of the included claims. All matters set forth herein or shown in the accompanying drawings are to be interpreted in an illustrative and non-limiting sense.

What is claimed is:

1. A card ejection unit of an improved IC card device, which card ejection unit comprising:
    a motor;
    a rotation bar, rotably positioned on an axle comprising a distal end thereof supporting said motor, wherein the rotation bar comprises a support portion at a distal end thereof, wherein said support portion is supported against an end of said motor, and the rotation bar comprises another support portion at a primal end thereof, which is supported against the push portion of a horizontal buckle;
    a horizontal buckle, comprising a buckle portion at a distal end thereof and a push portion adjacent to said buckle portion corresponding to said support portion of the rotation bar; and
    a vertical elastic element, comprising a buckle portion at a side, a push card portion adjacent to said buckle portion for ejecting the IC card, and an elastic element at another side thereof, wherein said buckle portion of the vertical elastic element can buckle to said buckle portion of the horizontal buckle;
    wherein said motor pushes said rotation bar, and when said rotation bar rotates, a distal end of said rotation bar pushes said horizontal buckle to slide horizontally to release said vertical elastic element.

2. The card ejection unit of an improved IC card device accordingly to claim 1, wherein said motor is a magnetic valve or a stretchable motor device.

3. The card ejection unit of an improved IC card device accordingly to claim 1, wherein said rotation bar, said horizontal buckle and said vertical elastic element are comprised of a plastic or a metal material.

4. The card ejection unit of an improved IC card device accordingly to claim 1, wherein an elastic element of said vertical elastic element comprised of a compressed spring or an extensional spring.

5. The card ejection unit of an improved IC card device accordingly to claim 1, wherein said card ejection unit is applied in a reading device of any IC card or magnetic card.

6. A card ejection unit of an improved IC card device, which improved IC card device comprising:
    a base, comprising a horizontal slide track, a vertical slide track, a positioning member, an axle and an elastic element, wherein said horizontal slide track is a slide track for a horizontal buckle, and said vertical slide track is a slide track for a vertical elastic element, and said positioning member for positioning a motor;
    a reading unit, comprising a reading portion, a soft circuit and a calculation portion; and
    a card ejection unit, comprising a motor, a rotation bar, a horizontal buckle and a vertical elastic element, wherein said rotation bar is positioned corresponding to said motor whose center is movably connected to said base and a distal end of said rotation bar is supported against a distal end of said motor, and a primal end of said rotation bar is supported against a distal end of said horizontal buckle, wherein said horizontal buckle comprises a buckle portion buckled so as to connect to a buckle portion of the vertical elastic element, wherein the flange of said buckle portion of the vertical elastic element can slide on the sliding surface of said horizontal buckle, and a push card portion is positioned adjacent to said buckle portion of the vertical elastic element for ejecting the IC card.

7. The card ejection unit of an improved IC card device according to claim 6, wherein said base is comprised of a plastic or a metal.

8. The card ejection unit of an improved IC card device according to claim 6, wherein said elastic element of said base is comprised of a flat spring, a torsional spring, a compressed spring or an extensional spring.

9. The card ejection unit of an improved IC card device according to claim 6, wherein said elastic element is positioned on said horizontal buckle.

10. The card ejection unit of an improved IC card device according to claim 6, wherein said improved IC card ejection unit is applied in a reading device of an IC card or a magnetic card.

11. The card ejection unit of an improved IC card device according to claim 6, wherein said reading unit is applied to read one of an IC card, a prepaid card, an ATM card, a credit card and a MRT card.

* * * * *